United States Patent
Seshita (10) Patent No.: US 8,952,745 B2
(45) Date of Patent: Feb. 10, 2015

(54) TEMPERATURE DETECTING CIRCUIT, TEMPERATURE COMPENSATING CIRCUIT, AND BUFFER CIRCUIT

(71) Applicant: Kabushiki Kaisha Toshiba, Tokyo (JP)

(72) Inventor: Toshiki Seshita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/931,284

(22) Filed: Jun. 28, 2013

(65) Prior Publication Data

US 2014/0184311 A1    Jul. 3, 2014

(30) Foreign Application Priority Data

Dec. 28, 2012  (JP) ................... 2012-288727

(51) Int. Cl.
*H01L 35/00* (2006.01)
*G05F 3/08* (2006.01)

(52) U.S. Cl.
CPC ........................................ *G05F 3/08* (2013.01)
USPC .......................................... 327/513; 327/512

(58) Field of Classification Search
CPC . G05F 3/245; G01K 7/01–7/015; G01K 7/14; G01K 7/16; G05G 3/245
USPC ................................................ 327/512, 513
See application file for complete search history.

(56) References Cited

U.S. PATENT DOCUMENTS

| | | | | |
|---|---|---|---|---|
| 4,352,053 A * | 9/1982 | Oguchi et al. | ................. | 323/220 |
| 4,506,290 A * | 3/1985 | Hashimoto | ................. | 348/225.1 |
| 4,736,166 A * | 4/1988 | Eckland et al. | ................ | 330/284 |
| 5,546,041 A * | 8/1996 | Szajda | ........................... | 327/512 |
| 5,659,253 A * | 8/1997 | Busking | ......................... | 324/648 |
| 6,114,910 A * | 9/2000 | Goff | .............................. | 330/289 |
| 6,169,528 B1 | 1/2001 | Oguchi et al. | | |
| 6,297,709 B1 * | 10/2001 | Wey et al. | ..................... | 333/17.1 |
| 6,472,860 B1 * | 10/2002 | Tran et al. | .................. | 324/76.11 |
| 6,831,626 B2 * | 12/2004 | Nakamura et al. | ............ | 345/101 |
| 6,934,645 B2 * | 8/2005 | Kim | ................. | 702/64 |
| 6,997,606 B2 * | 2/2006 | Marinet et al. | ................. | 374/178 |
| 7,057,382 B2 * | 6/2006 | Sigurdardottir | ............... | 323/313 |
| 7,521,980 B2 * | 4/2009 | Koen | ............................. | 327/308 |
| 7,528,644 B2 * | 5/2009 | Choi et al. | .................... | 327/512 |
| 7,595,656 B2 | 9/2009 | Hayami et al. | | |

(Continued)

FOREIGN PATENT DOCUMENTS

| | | |
|---|---|---|
| JP | 06-347337 | 12/1994 |
| JP | 2004-071864 | 3/2004 |
| JP | 2005-347785 | 12/2005 |

*Primary Examiner* — Thomas J Hiltunen
(74) *Attorney, Agent, or Firm* — Patterson & Sheridan, LLP (57) ABSTRACT

A temperature detecting circuit includes a first rectifying element with a cathode at a first reference voltage and an anode connected to a first node, a first impedance element connected in series with a second rectifying element between the first rectifying element and a second reference voltage, a third rectifying element with a cathode at the first reference voltage and an anode connected to a second node, a second impedance element and a fourth rectifying element connected in series between the third rectifying element and the second reference voltage, and a differential amplifier that outputs a differential signal pair corresponding to the difference in potential between the first node and the second node. The differential signals in the pair vary in magnitude in opposite directions in response to temperature changes.

19 Claims, 6 Drawing Sheets

(56) References Cited

U.S. PATENT DOCUMENTS

| | | | |
|---|---|---|---|
| 8,177,426 B2 * | 5/2012 | Guo et al. | 374/178 |
| 2003/0067344 A1 | 4/2003 | Nanba et al. | |
| 2005/0264971 A1 * | 12/2005 | Morino | 361/103 |
| 2009/0023415 A1 | 1/2009 | Seshita | |
| 2009/0256623 A1 * | 10/2009 | Tajima | 327/512 |
| 2011/0050323 A1 | 3/2011 | Seshita | |
| 2011/0051520 A1 | 3/2011 | Kim | |
| 2011/0169551 A1 * | 7/2011 | Stanescu et al. | 327/512 |

\* cited by examiner

TEMPERATURE DETECTING CIRCUIT, TEMPERATURE COMPENSATING CIRCUIT, AND BUFFER CIRCUIT

CROSS-REFERENCE TO RELATED APPLICATION

This application is based upon and claims the benefit of priority from Japanese Patent Application No. 2012-288727, filed Dec. 28, 2012, the entire contents of which are incorporated herein by reference.

FIELD

Embodiments described herein relate generally to a temperature detecting circuit, a temperature compensating circuit, and a buffer circuit.

BACKGROUND

For a semiconductor integrated circuit that outputs a digital signal in synchronization with a clock signal of 10 MHz or higher frequency, an output interface circuit is typically arranged for reliable high speed operation. For example, for a digital signal in synchronization with a 26 MHz clock signal, it is required that a rising edge time (hereinafter to be referred to as tr) and a falling edge time (hereinafter to be referred to as tf) of the digital signal be about 2 to 6 nanoseconds (ns). A low limit is set for tr and tf to prevent noise generation.

Consequently, in the design of the output interface circuit, circuit constants of structural parts are adjusted to obtain the desired tr, tf. However, due to variations in power supply voltage and variation in temperature, tr and tf vary, so that such adjustment is not easily accomplished.

An output potential of a band gap reference circuit (hereinafter to be referred to as a BGR circuit) which is free from the influence of the variation in the power supply voltage and the variation in the temperature can be taken as a reference potential, and tr and tf adjusted. However, the BGR circuit does not have good responsiveness, so that for an integrated circuit with a low power supply voltage or one that is required to conduct high-speed data output immediately after power is turned on, the response speed of the BGR circuit cannot catch up with the timing of output data.

DETAILED DESCRIPTION

Embodiments provide a temperature detecting circuit, a temperature compensating circuit, and a buffer circuit that can adjust a rising edge time and a falling edge time of a signal with good responsiveness.

According to one embodiment, a temperature detecting circuit includes a first rectifying element (e.g., a diode) with a cathode at a first reference voltage and an anode connected to a first node, a first impedance element and a second rectifying element connected in series between the first node and a second reference voltage, a third rectifying element with a cathode at the first reference voltage and an anode connected to a second node, a second impedance element and a fourth rectifying element connected in series between the second node and the second reference voltage, and a differential amplifier configured to output a differential signal pair corresponding to a difference in potential between the first node and the second node. The magnitudes of signals of the differential signal pair vary in opposite directions in response to changes in temperature.

Embodiments will be described with reference to the figures.

Figure 1:
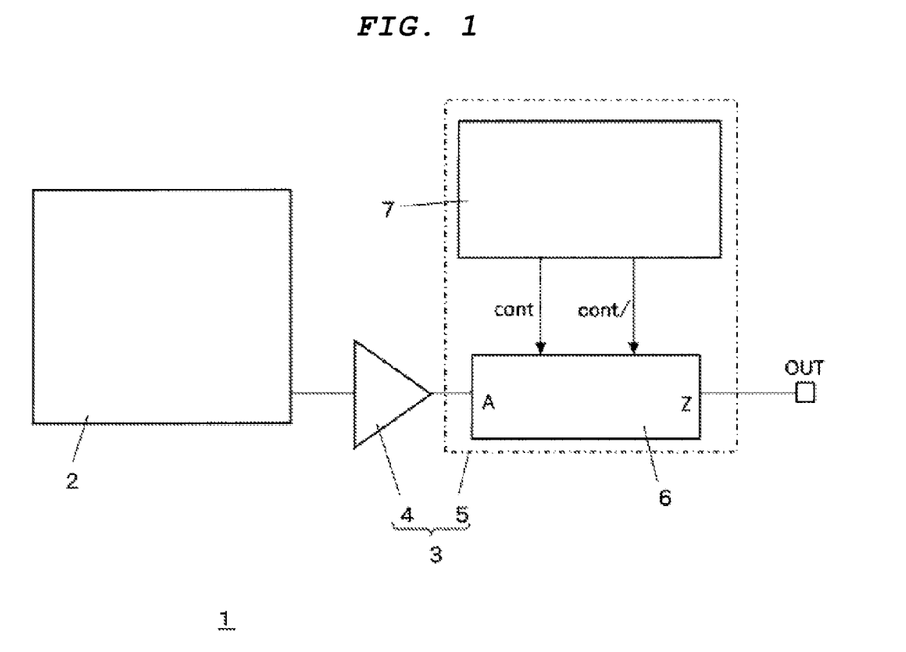
FIG. 1 is a block diagram illustrating the schematic configuration of a semiconductor integrated circuit including a temperature detecting circuit, a temperature compensating circuit, and a buffer circuit according to an embodiment.

FIG. 1 is a block diagram illustrating the schematic configuration of a semiconductor integrated circuit 1 including a temperature detecting circuit, a temperature compensating circuit and a buffer circuit according to an embodiment. As shown in FIG. 1, the semiconductor integrated circuit 1 has an internal circuit 2 and an output buffer 3. The output buffer 3 buffers an output signal of the internal circuit 2 and outputs the signal through an output terminal OUT. There is no restriction on the specific circuit configuration of the internal circuit 2. For example, the internal circuit 2 can be formed from a combination circuit including logic gates that carry out various types of logic operations, flip-flops, etc. When the internal circuit 2 outputs plural output signals, output buffer 3 may be arranged for each output signal.

The output buffer 3 includes a buffer section 4 and a temperature compensating circuit 5. The temperature compensating circuit 5 includes a variable output resistor 6 and a temperature detecting circuit 7.

The buffer section 4 buffers the output signal of the internal circuit 2 and supplies the output signal to an end of the variable output resistor 6. The variable output resistor 6 is between an output node of the buffer section 4 and output terminal OUT. Resistance of the variable output resistor 6 can be adjusted corresponding to an output signal of the temperature detecting circuit 7. The resistance of the variable output resistor 6 is controlled by the temperature detecting circuit 7 so that a rising edge time tr and a falling edge time tf of the output signal are within a prescribed time range independent of temperature effects.

Figure 2:
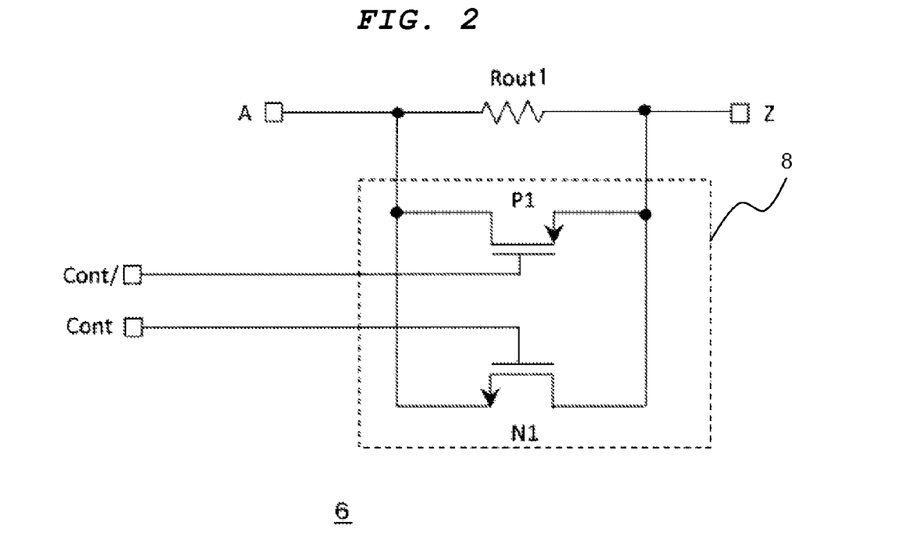
FIG. 2 is a circuit diagram illustrating an example of the internal configuration of a variable output resistor.

FIG. 2 is a circuit diagram illustrating an example internal configuration of the variable output resistor 6. As shown in FIG. 2, the variable output resistor 6 includes a resistor Rout1 between the output node of the buffer section 4 and the output terminal OUT. The variable output resistor 6 includes a transfer gate 8 connected in parallel with the resistor Rout1. The transfer gate 8 has an NMOS transistor N1 and a PMOS transistor P1 connected in parallel with the resistor Rout1.

A first signal (signal cont) of a differential signal pair from the temperature detecting circuit 7 is supplied to a gate of the NMOS transistor N1; a second signal (signal cont/) of the differential signal pair is supplied to a gate of the PMOS transistor P1.

For the temperature detecting circuit 7, by adjusting the signal levels of the differential signal pair (cont, cont/) according to the temperature, the resistance of the variable output resistor 6 is adjusted so that the rising edge time tr and the falling edge time tf of the signal output from the output terminal OUT are within a prescribed time region, independent of the temperature. For example, when the frequency of the output signal is about 26 MHz, the rising edge time tr and the falling edge time tf of the output signal are within the range of 2 to 6 ns.

Figure 3:
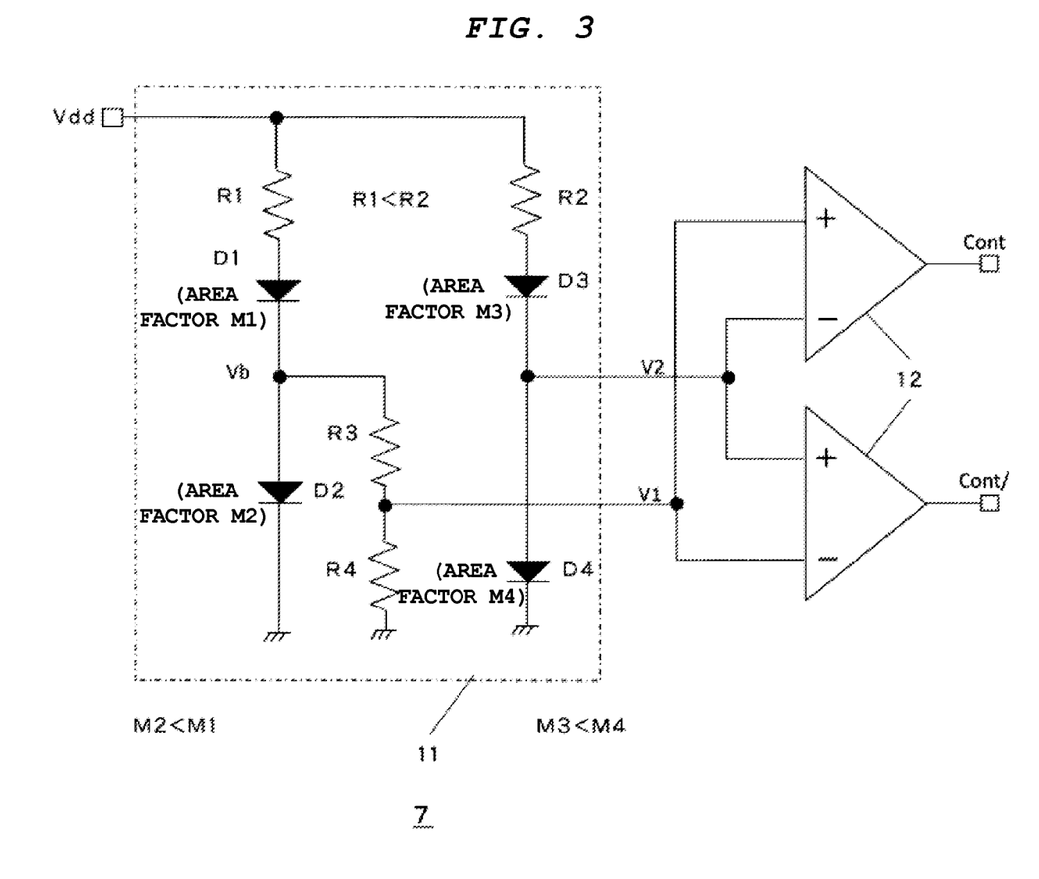
FIG. 3 is a circuit diagram illustrating a first example of a temperature detecting circuit.

FIG. 3 is a circuit diagram illustrating a first example of the temperature detecting circuit 7. As shown in FIG. 3, the temperature detecting circuit 7 has a temperature detecting section 11 that outputs a differential signal pair V1, V2 and a differential amplifier 12 that amplifies the differential signal pair V1, V2 and generates the differential signal pair cont, cont/.

The temperature detecting section 11 includes a resistor (a first impedance element) R1, a diode (a second rectifying element) D1, and a diode (a first rectifying element) D2 connected in series between a power supply voltage (a second reference voltage) Vdd and a ground voltage (a first reference voltage) Vss; a resistor (a second impedance element) R2, a diode (a fourth rectifying element) D3, and a diode (a third rectifying element) D4 also connected between the power supply voltage Vdd and the ground voltage Vss; and a resistor R3 and a resistor R4 (collectively, a first voltage dividing circuit) connected in series between a middle node between the diodes D1, D2 (a first middle node) Vb and the ground voltage Vss.

The connecting order of the resistor R1 and the diode D1 may be reversed. That is, one may also adopt a scheme in which an anode of the diode D1 is connected to the power supply voltage Vdd, a cathode is connected to one end of the resistor R1, and the other end of the resistor R1 is connected to the middle node Vb. Similarly, the order of connection of the resistor R2 and the diode D3 may also be reversed. That is, one may also adopt a scheme in which an anode of the diode D3 is connected to the power supply voltage Vdd, a cathode is connected to one end of the resistor R2, and the other end of the resistor R2 is connected to the middle node V2 between the diodes D3, D4.

One signal V1 of the differential signal pair is a signal obtained by voltage dividing by the resistors R3, R4 connected in series; the other signal V2 of the differential signal pair is a signal at the middle node (a second middle node) between the diodes D3, D4.

The following listed relationship is set between the resistances of the resistors R1, R2 and area factors of the diodes D1 to D4 of the temperature detecting section 11.

$$R1 < R2 \quad (1)$$

$$\text{Area factor } M1 \text{ of diode } D1 > \text{area factor } M2 \text{ of diode } D2 \quad (2)$$

$$\text{Area factor } M3 \text{ of diode } D3 < \text{area factor } M4 \text{ of diode } D4 \quad (3)$$

Here, the area factor refers to the relative size of the diode. The larger the area factor, the easier a current flows in the diode.

The reason for setting the resistances of the resistors R1, R2 and the area factors M1 to M4 of the diodes D1 to D4 of the temperature detecting section 11 according to (1) to (3) will be explained.

As an example, the resistors R1 to R4 and the area factors M1 to M4 of the diodes D1 to D4 are set at the following values:

R1=5 kΩ, R2=R3=460 kΩ, R4=1850 kΩ
Area factors M1, M4 of diodes D1, D4=20
Area factors M2, M3 of diodes D2, D3=1

The differential signal pair V1, V2 output from the temperature detecting section 11 are input to the differential amplifier 12 and are amplified to generate the differential signal pair cont, cont/. The differential signal pair cont, cont/ have temperature characteristics opposite from each other. That is, the temperature detecting section 11 generates the differential signal pair V1, V2 input to the differential amplifier 12 so that differential signal pair cont, cont/ output from the differential amplifier 12 have temperature characteristics opposite from each other.

Figure 4:
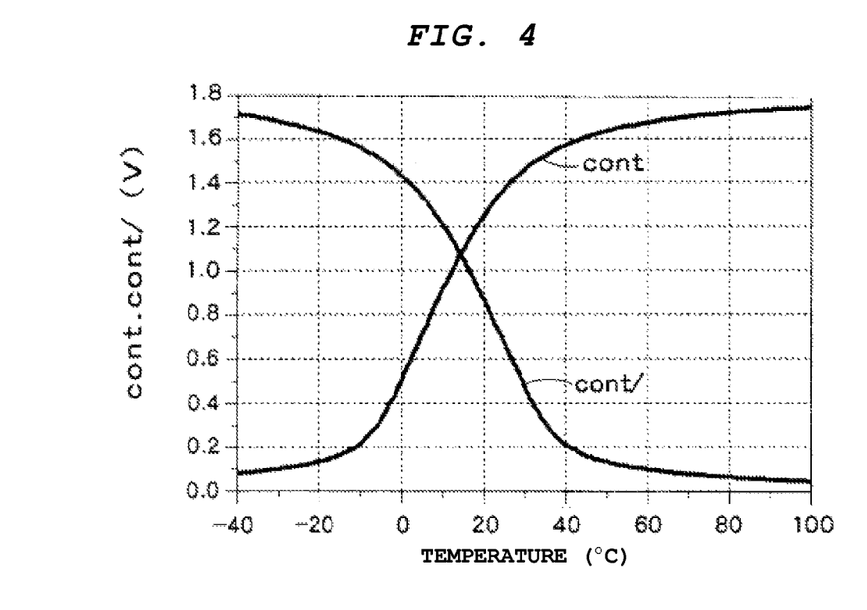
FIG. 4 is a graph illustrating the temperature dependence of a differential signal pair (cont, cont/) output from the temperature detecting circuit shown in FIG. 3.

FIG. 4 is a graph illustrating the temperature dependence of the differential signal pair cont, cont/ output from the temperature detecting circuit 7 shown in FIG. 3. In FIG. 4, the abscissa represents the temperature (° C.), and the ordinate represents the voltage level (V) of the differential signal pair cont, cont/. As shown in the figure, the first signal (signal cont) of the differential signal pair has the temperature characteristic such that the voltage level rises as the temperature becomes higher, while the second (signal cont/) of the differential signal pair has the temperature characteristic such that the voltage level decreases as the temperature becomes higher. As a result, the signal waveforms of the differential signal pair cont, cont/ cross each other between 0 to 20° C.

In this way, the differential signal pair cont, cont/have their temperature characteristics opposite each other. Similarly, the differential signal pair V1, V2 also have their temperature characteristics opposite each other.

Figure 5:
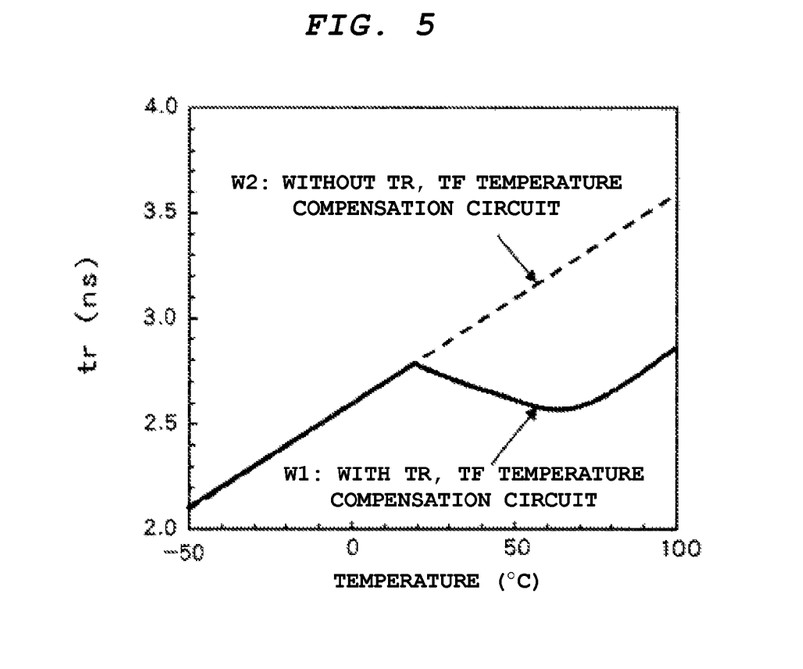
FIG. 5 is a graph illustrating the temperature dependence of a rising edge time tr and a falling edge time tf of a signal output from an output terminal of the semiconductor integrated circuit when the differential signal pair (cont, cont/) are output as shown in FIG. 4 from the temperature detecting circuit.

For the temperature detecting circuit 7, FIG. 5 is a graph illustrating the temperature dependence of the rising edge time tr and the falling edge time tf of the signal output from the output terminal OUT of the semiconductor integrated circuit 1 that outputs the differential signal pair cont, cont/ as shown in FIG. 4. In FIG. 5, the abscissa represents the temperature (° C.) and the ordinate represents the tr, tf (ns). In FIG. 5, a solid line waveform w1 shows the tr, tf according to the present embodiment; a broken line waveform w2 shows the tr, tf when the temperature compensating circuit 5 shown in FIG. 1 is not arranged.

When the temperature compensating circuit 5 according to the present embodiment is not arranged, as can be seen from the broken line waveform w2 in FIG. 5, as the temperature rises both tr and tf increase. As the temperature becomes higher, both the rising edge and the falling edge of the signal become obtuse, so that the performance cannot be guaranteed. On the other hand, when the temperature compensating circuit 5 according to the present embodiment is arranged, as can be seen from the solid line waveform w1 shown in FIG. 5, while both tr and tf increase as the temperature rises until reaching a prescribed temperature, both tr and tf decrease when the temperature further rises. As a result, both tr and tf do not become longer than a prescribed time range, it is possible to suppress the temperature dependence of the rising edge time and the falling edge time, and the temperature range wherein the performance can be guaranteed becomes wider.

In the following, the reasons for setting the resistances for the resistors R1, R2 and the area factors for the diodes D1 to D4 of the temperature detecting section 11 in the temperature detecting circuit 7 will be presented.

The temperature detecting section 11 shown in FIG. 3 takes a voltage obtained by resistance potential dividing of a voltage Vb1 at the middle node of the diodes D1, D2 as one signal V1 of the differential signal pair; temperature detecting section 11 takes a voltage Vb2 at the middle node of the diodes D3, D4 as the other signal V2 of the differential signal pair. The one signal V1 of the differential signal pair is generated by resistance potential dividing by the resistors R3, R4, so that the voltage Vb1 at the middle node should be set higher than the voltage Vb2. Here, by having R1<R2, the fall in voltage on the resistor R1 is smaller than the fall in voltage on the resistor R2.

Figure 6:
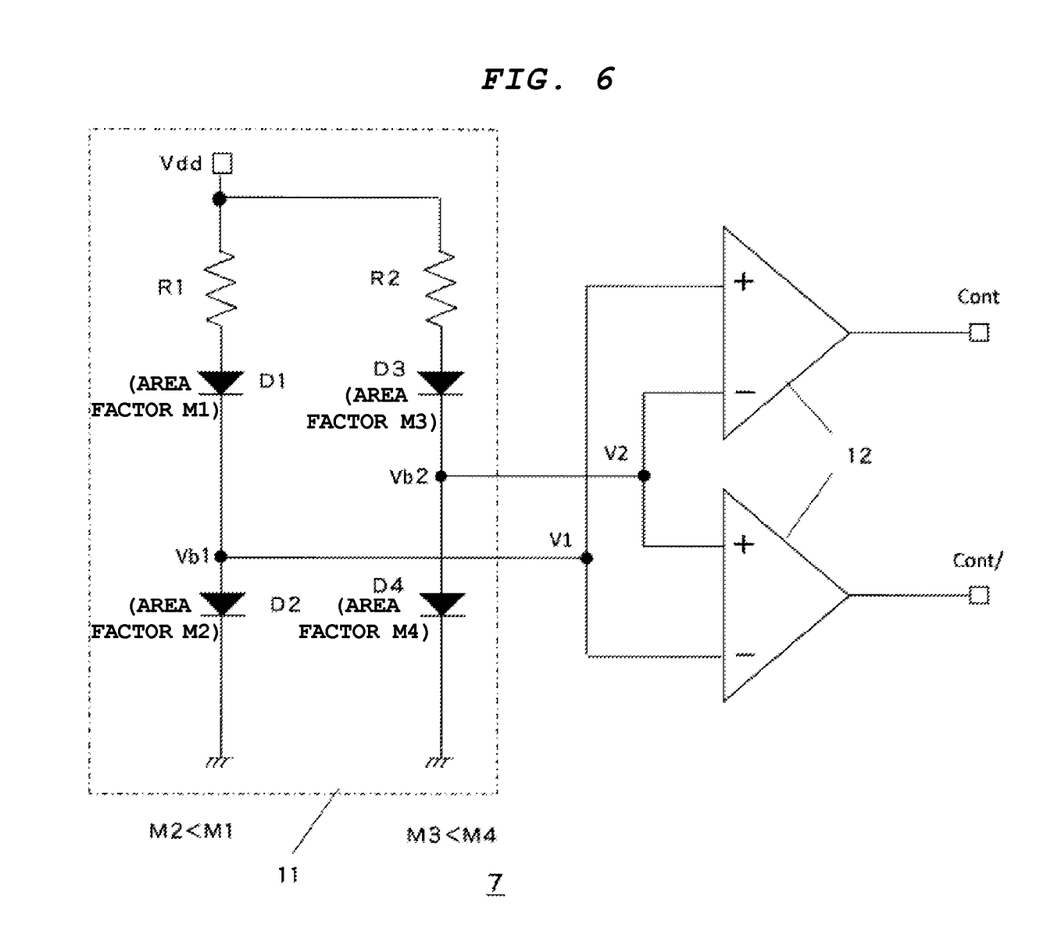
FIG. 6 is a circuit diagram illustrating a second example of the temperature detecting circuit.

The resistors R3, R4 connected in series as shown in FIG. 3 may be omitted in some embodiments. FIG. 6 is a circuit diagram illustrating a second example of the temperature detecting circuit 7 having the resistors R3, R4 omitted. In FIG. 6, the current-voltage characteristics of the diodes D1 to D4 are represented by equation (4).

$$I = M(V - VF)/Rs \quad (4)$$

In equation (4), M represents the area factor of the diode, VF represents a forward fall in voltage of the diode, and Rs represents a differential resistance near V=VF.

The current-voltage characteristics of the resistor R1 are represented by equation (5).

$$I = \{Vdd - (Vb1 + Vdid1)\}/R \quad (5)$$

In equation (5), Vdid1 represents a forward voltage of the diode D1.

The current-voltage characteristics of the diode D1 can be represented by the following equation (6) according to equation (4).

$$I = M1(Vdid1 - VF)/Rs \quad (6)$$

Equation (7) is a modified form of equation (6).

$$Vdid1 = I \times Rs/M1 + VF \quad (7)$$

In equation (7), M1 represents the area factor of the diode D1.

Similarly, the current-voltage characteristics of the diode D2 are represented by equation (8).

$$I = M2(Vb1 - VF)/Rs \quad (8)$$

A modification of equation (8) leads to equation (9).

$$Vb1 = I \times Rs/M2 + VF \quad (9)$$

By substituting equation (7) and equation (9) into equation (5), and solving for I, one obtains equation (10).

$$I = (Vdd - 2VF)/\{R + Rs(1/M1 + 1/M2)\} \quad (10)$$

By substituting equation (10) into equation (9), one obtains equation (11).

$$Vb1 = [Vdd + VF\{M2(R/Rs) + (M2/M1) - 1\}]/\{M2(R/Rs) + 1 + (M2/M1)\} \quad (11)$$

Here, when R is sufficiently small and M2(R/Rs)<<1, equation (11) can be approximately represented by equation (12).

$$Vb \approx [Vdd + VF\{(M2/M1) - 1\}]/[\{(M2/M1) + 1\}] \quad (12)$$

The forward voltage fall VF of the diode has a temperature dependence with a negative temperature coefficient. Consequently, from equation (12), one can draw the following conclusion. When M2>M1, Vb1 has a negative temperature coefficient and when M2<M1, Vb1 has a positive temperature coefficient.

Equations (5) through (12) have the same relationship established for the serial connected resistor R2, diode D3 and diode D4. That is, when M4>M3, Vb2 has a negative temperature coefficient and when M4<M3, Vb2 has a positive temperature coefficient.

According to the present embodiment, among the differential signal pair Vb1=V1 and Vb2=V2 output from the temperature detecting section 11, one signal has a positive temperature coefficient and the other signal has a negative temperature coefficient. As a result, the temperature dependence can be compensated.

In the related art, a reference potential without any temperature dependence is generated by a BGR circuit. However, the BGR circuit has a poor responsiveness. In consideration of this problem, according to the present embodiment, instead of using the reference potential without temperature dependence, the differential signal pair V1, V2 having temperature characteristics opposite from each other are used to carry out the temperature compensation. But because both of the differential signal pair V1, V2 have small signal amplitudes, it is hard for temperature compensation to occur with a high precision using only one of the differential signal pair V1, V2. Here, according to the present embodiment, the differential signal pair V1, V2 having temperature characteristics opposite from each other are used, and the differential signal pair cont, cont/ amplified by the differential amplifier 12 is supplied to the variable output resistor 6 to allow temperature compensation for the resistance of the variable output resistor 6.

By means of the differential signal pair cont, cont/, the transfer gate 8 shown in FIG. 2 is controlled, such that the following effects can be realized: for example, suppose the temperature rises, an ON resistance of the transfer gate 8 can be decreased and, as shown in FIG. 5, when the temperature rises, both the tr and tf can be made shorter.

With the circuit configuration shown in FIG. 6, the differential signal pair V1, V2 output from the temperature detecting section 11 have the temperature characteristics shown in FIG. 4, there is no specific restriction on the magnitude relationship between the resistors R1, R2. R1<R2 is satisfactory, R1>R2 is satisfactory, and R1=R2 is also satisfactory. Here, however, for the area factors M1 through M4 of the diodes D1 to D4, the condition of M2<M1 and the condition of M3<M4 should be satisfied.

Figure 7:
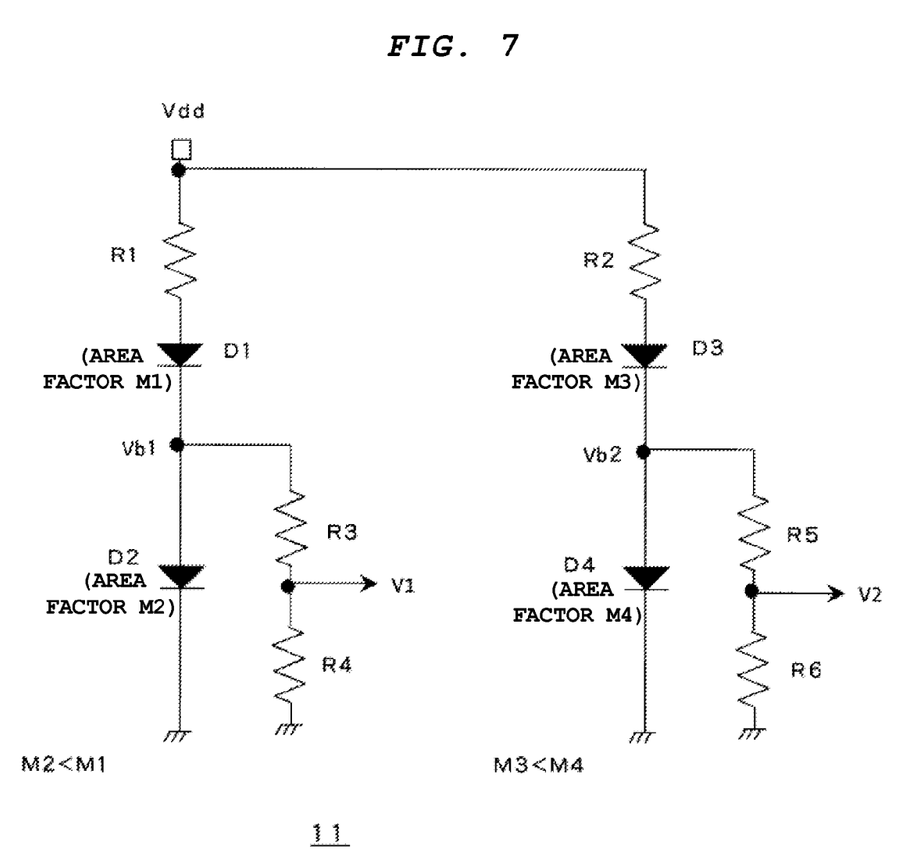
FIG. 7 is a circuit diagram illustrating a third example of a temperature detecting section.

The circuit configuration of the temperature detecting section 11 is not limited to those shown in FIG. 3 and FIG. 6. FIG. 7 is a circuit diagram illustrating a third example of the temperature detecting section 11. For the temperature detecting section 11 shown in FIG. 7, in addition to the configuration of the temperature detecting section 11 shown in FIG. 3, resistors R5, R6 (a second potential dividing circuit) are connected in series between the middle node of the diodes D3, D4 and the ground voltage Vss, and a potential divided voltage obtained by the resistors R5, R6 becomes the output voltage V2 of the temperature detecting section 11.

In the case shown in FIG. 7, both of the differential signal pair V1, V2 become voltages obtained by resistor potential dividing of the voltages Vb1, Vb2 at the middle nodes of the diodes D1, D2 and the diodes D3, D4, respectively, and the differential signal pair V1, V2 become voltages lower than the voltages Vb1, Vb2. Consequently, there is no specific restriction on the magnitude relationship between the resistors R1, R2. R1<R2 is satisfactory, R1>R2 is satisfactory, and R1=R2 is also satisfactory. Here, however, for the area factors M1 through M4 of the diodes D1 through D4, the condition of M2<M1 and the condition of M3<M4 should be satisfied.

Figure 8:
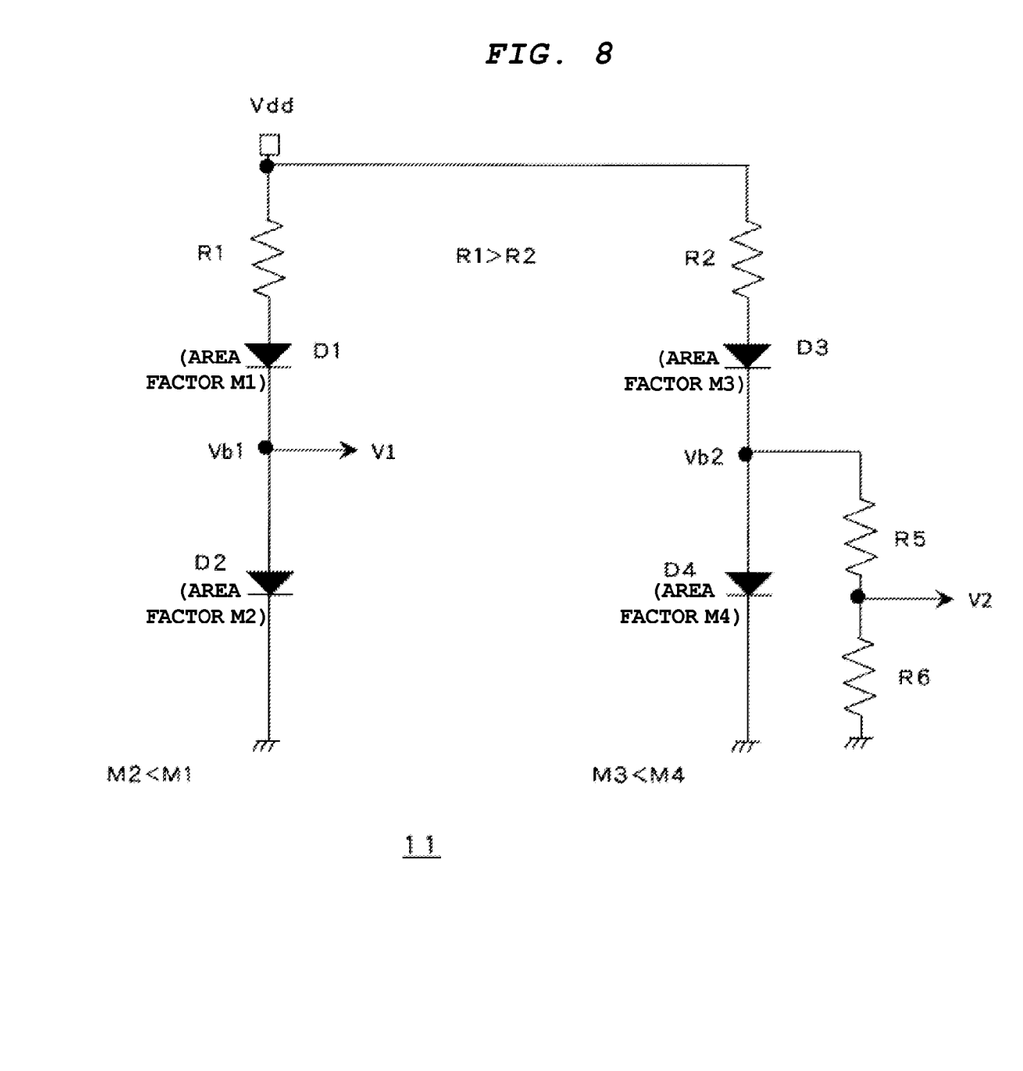
FIG. 8 is a circuit diagram illustrating a fourth example of the temperature detecting section.

In a fourth example of the temperature detecting section 11 shown in FIG. 8, the resistors R3, R4 can also be omitted from the circuit shown in FIG. 7. In this case, because it is preferred that the middle node Vb2 be higher than Vb1, one sets R1>R2.

In this way, according to the present embodiment, the differential signal pair V1, V2 output from the temperature detecting section 11 have temperature characteristics opposite from each other and the resistance of the variable output resistor 6 included between the output node of the buffer section 4 and the output terminal OUT is adjusted on the basis of the differential signal pair V1, V2. Consequently, it is possible to have the rising edge time tr and the falling edge time tf of the output terminal OUT within a prescribed time range independent of the temperature.

Temperature compensation can be carried out without using a BGR circuit that generates the reference potential free of the influence of the temperature. Consequently, compared with the case in which the BGR circuit is arranged, it is possible to improve the responsiveness of the output signal and also to simplify the circuit configuration.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A temperature detecting circuit, comprising:
a first rectifying element with a cathode at a first reference voltage and an anode connected to a first node;
a first impedance element connected in series with a second rectifying element, the first impedance element and the second rectifying element connected between the first node and a second reference voltage;
a third rectifying element with a cathode at the first reference voltage and an anode connected to a second node;
a second impedance element connected in series with a fourth rectifying element, the second impedance element and the fourth rectifying element connected between the second node and the second reference voltage;
a first voltage dividing circuit connected between the first node and the first reference voltage; and
a differential amplifier configured to output a differential signal pair based on a difference in potential between the first node and the second node, wherein
in response to temperature changes, a magnitude of a first signal of the differential signal pair increases when a magnitude of a second signal of the differential signal pair decreases and the magnitude of the first signal of the differential signal pair decreases when the magnitude of the second signal of the differential signal pair increases, and
the difference in potential between the first node and the second node is determined using a first divided voltage corresponding to the potential at the first node, the first divided voltage being supplied to the differential amplifier from the first voltage dividing circuit.

2. A temperature compensating circuit, comprising:
a temperature detecting circuit, including:
a first rectifying element with a cathode at a first reference voltage and an anode connected to a first node;
a first impedance element connected in series with a second rectifying element, the first impedance element and the second rectifying element connected between the first node and a second reference voltage;
a third rectifying element with a cathode at the first reference voltage and an anode connected to a second node;
a second impedance element connected in series with a fourth rectifying element connected in series, the second impedance element and the fourth rectifying element connected between the second node and the second reference voltage; and
a differential amplifier configured to output a differential signal pair corresponding to a difference in potential between the first node and the second node; and
a transfer gate configured to switch a conduction state between an input terminal and an output terminal according the differential signal pair;
wherein a magnitude of a first signal of the differential signal pair output from the differential amplifier and a magnitude of a second signal of the differential signal pair vary in opposite directions in response to temperature changes.

3. The temperature compensating circuit according to claim 2, wherein the anode of the second rectifying element is at the second reference voltage and the cathode of the second rectifying element is connected to the first impedance element.

4. The temperature compensating circuit according to claim 2, wherein the anode of the fourth rectifying element is at the second reference voltage and the cathode of the fourth rectifying element is connected to the second impedance element.

5. The temperature detecting circuit according to claim 1, wherein an impedance value of the first impedance element is less than an impedance value of the second impedance element.

6. The temperature detecting circuit according to claim 1, wherein
an area factor of the first rectifying element is less than an area factor of the second rectifying element, and
an area factor of the third rectifying element greater than an area factor of the fourth rectifying element.

7. The temperature detecting circuit according to claim 1, further comprising:
a second voltage dividing circuit connected between the second node and the first reference voltage;
wherein the difference in potential between the first node and the second node is determined using the first divided voltage and a second divided voltage corresponding to the potential at the second node, the second divided voltage being supplied to the differential amplifier from the second voltage dividing circuit.

8. The temperature detecting circuit according to claim 7, wherein
an area factor of the first rectifying element is less than an area factor of the second rectifying element, and
an area factor of the third rectifying element greater than an area factor of the fourth rectifying element.

9. A temperature detecting circuit, comprising:
a first rectifying element with a cathode at a first reference voltage and an anode connected to a first node;
a first impedance element connected in series with a second rectifying element, the first impedance element and the second rectifying element connected between the first node and a second reference voltage;
a third rectifying element with a cathode at the first reference voltage and an anode connected to a second node;
a second voltage dividing circuit connected between the second node and the first reference voltage;

a second impedance element connected in series with a fourth rectifying element, the second impedance element and the fourth rectifying element connected between the second node and the second reference voltage; and a differential amplifier configured to output a differential signal pair based on a difference in potential between the first node and the second node, wherein in response to temperature changes, a magnitude of a first signal of the differential signal pair increases when a magnitude of a second signal of the differential signal pair decreases and the magnitude of the first signal of the differential signal pair decreases when the magnitude of the second signal of the differential signal pair increases, the difference in potential between the first node and the second node is determined using a second divided voltage corresponding to the potential at the second node, the second divided voltage being supplied to the differential amplifier from the second voltage dividing circuit.

10. The temperature detecting circuit according to claim 9, wherein an area factor of the first rectifying element is less than an area factor of the second rectifying element, and an area factor of the third rectifying element greater than an area factor of the fourth rectifying element.

11. The temperature detecting circuit according to claim 9, wherein an impedance value of the second impedance element is less than an impedance value of the first impedance element.

12. The temperature compensating circuit according to claim 2, wherein an area factor of the first rectifying element is less than an area factor of the second rectifying element, and an area factor of the third rectifying element is greater than an area factor of the fourth rectifying element.

13. The circuit of claim 12, wherein the transfer gate comprises a p-type metal oxide semiconductor transistor and a n-type metal oxide semiconductor transistor connected in parallel between the input terminal and output terminal.

14. The circuit of claim 13, wherein a resistor is connected in parallel with the transistors.

15. The circuit of claim 13, wherein a first signal of the differential signal pair is supplied to a gate electrode of the n-type metal oxide semiconductor transistor, and a second signal of the differential signal pair is supplied to a gate electrode of the p-type metal oxide semiconductor transistor.

16. A buffer circuit, comprising:

a buffer section configured to buffer a signal received from an internal circuit and to output a buffered signal; and a temperature compensating circuit connected to the buffer section to receive the buffered signal at an input terminal thereof and including:

a first rectifying element with a cathode at a first reference voltage and an anode connected to a first node;

a first impedance element connected in series with a second rectifying element, the first impedance element and the second rectifying element connected between the first node and a second reference voltage;

a third rectifying element with a cathode at the first reference voltage and an anode connected to a second node;

a second impedance element connected in series with a fourth rectifying element connected in series, the second impedance element and the fourth rectifying element connected between the second node and the second reference voltage; and a differential amplifier configured to output a differential signal pair corresponding to a difference in potential between the first node and the second node; and a transfer gate configured to switch a conduction state between the input terminal and an output terminal of the buffer circuit according the differential signal pair, wherein a magnitude of a first signal of the differential signal pair and a magnitude of a second signal of the differential signal pair vary in opposite directions in response to temperature changes.

17. The circuit of claim 16, wherein the transfer gate comprises a p-type metal oxide semiconductor transistor and a n-type metal oxide semiconductor transistor connected in parallel between the input terminal and output terminal.

18. The circuit of claim 17, wherein a resistor is connected in parallel with the transistors.

19. The circuit of claim 16, wherein an impedance value of the first impedance element is less than an impedance value or the second impedance element, an area factor of the first rectifying element is less than an area factor of the second rectifying element, and an area factor of the third rectifying element greater than an area factor of the fourth rectifying element.

* * * * *